United States Patent
Sekiguchi et al.

(10) Patent No.: US 9,418,653 B2
(45) Date of Patent: Aug. 16, 2016

(54) OPERATION ASSISTING METHOD AND OPERATION ASSISTING DEVICE

(71) Applicant: Panasonic Intellectual Property Management Co., Ltd., Osaka (JP)

(72) Inventors: Takeshi Sekiguchi, Kanagawa (JP); Nobuyuki Kunieda, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/715,573

(22) Filed: May 18, 2015

(65) Prior Publication Data
US 2015/0340030 A1     Nov. 26, 2015

(30) Foreign Application Priority Data
May 20, 2014     (JP) .................................. 2014-104188

(51) Int. Cl.
| | |
|---|---|
| *G10L 15/22* | (2006.01) |
| *G10L 15/08* | (2006.01) |
| *G10L 15/26* | (2006.01) |
| *G10L 15/25* | (2013.01) |

(52) U.S. Cl.
CPC .............. *G10L 15/08* (2013.01); *G10L 15/083* (2013.01); *G10L 15/22* (2013.01); *G10L 15/25* (2013.01); *G10L 15/26* (2013.01); *G10L 2015/088* (2013.01); *G10L 2015/223* (2013.01)

(58) Field of Classification Search
None
See application file for complete search history.

(56) References Cited

U.S. PATENT DOCUMENTS

| | | | | |
|---|---|---|---|---|
| 2002/0107695 A1* | 8/2002 | Roth | ...................... | G10L 15/22 704/275 |
| 2004/0199388 A1* | 10/2004 | Armbruster | ............. | G10L 15/22 704/251 |
| 2008/0059175 A1* | 3/2008 | Miyajima | ............... | G10L 15/25 704/246 |
| 2009/0304232 A1 | 12/2009 | Tsukizawa | | |
| 2010/0256978 A1* | 10/2010 | Rosenbaum | ............ | G10L 15/22 704/244 |
| 2013/0185078 A1* | 7/2013 | Tzirkel-Hancock | .... | G10L 15/22 704/275 |
| 2015/0032448 A1* | 1/2015 | Wasserblat | ............... | G10L 15/26 704/235 |
| 2015/0161992 A1* | 6/2015 | Jung | ...................... | G10L 15/083 704/251 |

FOREIGN PATENT DOCUMENTS

| | | |
|---|---|---|
| JP | 11-231896 | 8/1999 |
| WO | 2008/007781 | 1/2008 |

\* cited by examiner

*Primary Examiner* — Huyen Vo
*Assistant Examiner* — Yi-Sheng Wang
(74) *Attorney, Agent, or Firm* — Greenblum & Bernstein, P.L.C.

(57) ABSTRACT

An operation assisting method comprising comparing input spoken voices with a preliminarily stored keyword associated with an operation target and determining whether or not the keyword is spoken, determining whether or not similarity between or among the input spoken voices falls within a predetermined range. In a case where it is determined that the keyword is not spoken, determining whether or not eyes of a user are directed at the operation target, and in a case of the similarity falling within the predetermined range, determining that the keyword is spoken, in a case of being determined that the eyes of the user are directed at the operation target.

13 Claims, 5 Drawing Sheets

OPERATION ASSISTING METHOD AND OPERATION ASSISTING DEVICE

BACKGROUND

1. Technical Field

The present disclosure relates to an operation assisting device and an operation assisting method that assist an operation based on the utterance of a keyword.

2. Description of the Related Art

In recent years, a technique for detecting, when a predetermined keyword is spoken, the keyword and starting a predetermined operation of an apparatus such as activating a system has been widely put to practical use.

Usually, determination of whether or not the keyword is spoken (hereinafter, called "keyword determination") is performed by calculating an evaluation value (score) indicating a plausibility (hereinafter, called a likelihood) that a keyword is included in a spoken voice and determining whether or not the evaluation value is greater than or equal to a predetermined threshold value. The evaluation value is calculated by, for example, voice recognition processing for the spoken voice.

However, in some cases, even if a keyword is actually spoken, an ambient sound, unintelligibility of utterance, or the like causes the evaluation value to be low. In this case, such a state occurs that it is difficult to operate an apparatus in spite of the user trying to speak the keyword (hereinafter, called "operation failure").

Therefore, a technique in which similarity between a keyword and a spoken voice is calculated and it is determined that the keyword is spoken in a case where the calculated similarity falls within a predetermined range is described in, for example, Japanese Unexamined Patent Application Publication No. 11-231896. According to such a technique, it is possible to reduce the occurrence of an operation failure.

However, in a case where a user forgets a keyword or remembers a wrong keyword, similarity between the keyword and a spoken voice becomes low. Therefore, in the related art, it is difficult to avoid the operation failure, and there is a possibility that an operation based on a keyword utterance (hereinafter, called a "keyword utterance operation") is disabled.

SUMMARY

One non-limiting and exemplary embodiment provides an operation assisting device and an operation assisting method capable of avoiding a state in which a keyword utterance operation is disabled.

In one general aspect, the techniques disclosed here feature an operation assisting device including a voice inputter that inputs a spoken voice, a sight-line inputter that detects, in a case where eyes of a user are directed at an operation target, the fact that the eyes are directed, and a keyword detector that determines that a keyword associated with the operation target is spoken, under a condition that the eyes are directed at the operation target after similarity between a plurality of input spoken voices falls within a predetermined range.

According to the present disclosure, it is possible to avoid a state in which the keyword utterance operation is disabled.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Hereinafter, an embodiment of the present disclosure will be described in detail with reference to drawings.

The present embodiment is an example of a specific embodiment in a case of being applied to an operation target installed in the vicinity of the driver seat of a vehicle.

<Configuration of Operation Assisting Device>

First, the configuration of an operation assisting device according to the present embodiment will be described.

Figure 1:
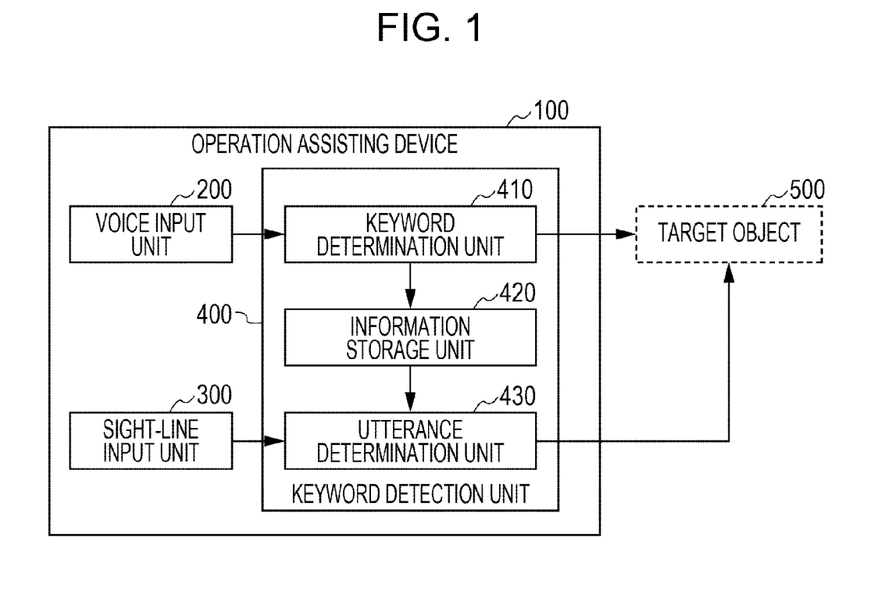
FIG. 1 is a block diagram illustrating an example of a configuration of an operation assisting device according to an embodiment of the present disclosure.

FIG. 1 is a block diagram illustrating an example of the configuration of the operation assisting device according to the present embodiment.

In FIG. 1, an operation assisting device 100 includes a voice input unit 200, a sight-line input unit 300, and a keyword detection unit 400. In addition, the operation assisting device 100 is connected to an operation target 500 (for example, a car air-conditioner controller) that is a target of a keyword utterance operation. In addition, the operation target 500 may be configured so as to be integrated with the operation assisting device 100.

It is assumed that keywords associated with the operation target 500 are preliminarily defined. In addition, it is assumed that such keywords are keywords for starting a predetermined operation (for example, dialogue processing with a user) for the operation target 500.

The voice input unit 200 inputs a spoken voice of the user and outputs the input spoken voice to the keyword detection unit 400. The voice input unit 200 is equipped with, for example, a microphone (not illustrated), collects and converts an ambient sound into voice data, and outputs the voice data to the keyword detection unit 400. For example, in a case where the driver of a vehicle or a fellow passenger performs utterance, the spoken voice thereof turns out to be included in the voice data.

When the eyes of the user (for example, the driver of a vehicle) are directed at a predetermined operation target, the sight-line input unit 300 detects that fact, and gives notice about the fact to the keyword detection unit 400. The sight-line input unit 300 is equipped with, for example, a digital video camera (not illustrated), analyzes images obtained by capturing an image of the face of the user, and sequentially determines whether or not the eyes of the user are directed at the operation target 500. In addition, the digital video camera may be a visible light camera or an infrared camera.

The determination of whether or not the eyes of the user are directed at the operation target 500 (hereinafter, called "sight-line determination") may be performed by setting an arrangement relationship between the digital video camera and the operation target 500 after adopting a publicly known sight-line direction detection method such as, for example, a method described in International Publication No. 2008/007781. In addition, in a case where a difference between the direction of the sight-line and the direction of the operation target 500 viewed from the user falls within a predetermined range, the sight-line input unit 300 may determine that the user directs eyes at the operation target 500. Such a predetermined range is decided in consideration of, for example, the detection error of the sight-line direction or the installation errors of individual apparatuses.

Under the condition that the eyes of the user are directed at the operation target 500 immediately after similarity between a plurality of input spoken voices falls within a predetermined range, the keyword detection unit 400 determines that a keyword associated with the operation target 500 is spoken. In addition, at the time of determining that the keyword is spoken, the keyword detection unit 400 starts the predetermined operation for the operation target 500.

The keyword detection unit 400 includes a keyword determination unit 410, an information storage unit 420, and an utterance determination unit 430.

The keyword determination unit 410 calculates an evaluation value indicating a likelihood that a keyword is included in a spoken voice. In addition, in a case where the calculated evaluation value is at a first level that is greater than or equal to a first threshold value and corresponds to a relatively high value, the keyword determination unit 410 determines that the keyword is spoken. In addition, upon determining that the keyword is spoken, the keyword determination unit 410 starts a predetermined operation for the operation target 500, based on the output of a control signal, or the like.

The evaluation value is set so as to become, for example, a value increased with an increase in a likelihood that a produced voice is a corresponding keyword. As the evaluation value, for example, confidence measure used at the time of determining whether a voice, included in the voice data and obtained by publicly known voice recognition processing, coincides with a corresponding keyword may be adopted. The confidence measure may be calculated based on a posterior probability in a hidden Markov model (HMM) or a likelihood (an acoustic likelihood or a linguistic likelihood) obtained by voice recognition processing. In this case, the keyword determination unit 410 preliminarily stores therein an acoustic model, a dictionary, and a language model, which relate to the above-mentioned keywords, and performs the voice recognition processing with reference to these pieces of information, thereby calculating the above-mentioned evaluation value.

Alternatively, as the evaluation value, for example, similarity calculated from distances between the pieces of voice data of the preliminarily registered keywords and the input voice data may be adopted. The similarity may be calculated by calculating distances between pieces of voice data using, for example, a publicly known distance calculation method that utilizes a predetermined sound feature quantity such as a spectrum and by performing dynamic programing (DP) matching in a voice interval. In this case, the keyword determination unit 410 preliminarily stores therein the pieces of voice data or the sound feature quantities of the above-mentioned keywords.

In addition, in a case where the evaluation value is at a second level that is less than the first threshold value and greater than or equal to a second threshold value, the keyword determination unit 410 stores a spoken voice corresponding to the evaluation value in the information storage unit 420. In addition, the spoken voice stored here may be the voice data itself or may be a sound feature quantity necessary for calculating the similarity between pieces of voice data.

The information storage unit 420 includes an information recording medium such as a memory and is used by the keyword determination unit 410 and the utterance determination unit 430. In other words, the information storage unit 420 stores therein a spoken voice during a time interval in which the evaluation value is determined to be at the second level.

In a case where a predetermined number, two or more, of spoken voices input during a predetermined time period before a timing when the eyes of the user are directed at the operation target 500 are stored in the information storage unit 420, the utterance determination unit 430 reads the corresponding spoken voices from the information storage unit 420. The time period before the timing when the eyes of the user are directed at the operation target 500 is, for example, a time interval from time 10 seconds before the timing to that timing. In addition, the utterance determination unit 430 calculates the similarity between the spoken voices and determines that a keyword is spoken, under the condition that the calculated similarity falls within a predetermined range. In addition, upon determining that the keyword is spoken, the utterance determination unit 430 starts a predetermined operation for the operation target 500, based on the output of a control signal, or the like.

In addition, it is desirable that, in a case where the predetermined operation is not started after utterance for the keyword utterance operation is started, the predetermined time period is a time period slightly longer than a time period before the eyes are unconsciously directed at the operation target 500, and the predetermined time period is, for example, 10 seconds.

In addition, it is desirable that the predetermined number is the number of times the same utterance is repeated before the eyes are unconsciously directed at the operation target 500 in a case where the predetermined operation is not started even though utterance for the keyword utterance operation is started, and the predetermined number is, for example, three.

In addition, it is only necessary to calculate the similarity using a publicly known registration type voice recognition algorithm. In other words, the utterance determination unit 430 may regard, as a registered voice, one piece of voice data stored in the information storage unit 420 and may calculate the similarity by performing matching processing with another piece of stored voice data. In addition, in the same way as, for example, the above-mentioned evaluation value, a value calculated from distances between pieces of voice data with respect to a predetermined sound feature quantity such as a spectrum may be adopted as the similarity. In addition, with respect to the similarity between three or more pieces of voice data, for example, the similarity between the pieces of voice data may be calculated for each pair of pieces of voice data, and the average value of the calculated similarity for individual pairs may be adopted.

In addition, the above-mentioned predetermined range that is the target range of the determination of the similarity is a level at which a likelihood of being the spoken voice of the same phrase is sufficiently high, and the above-mentioned predetermined range is, for example, a numerical value range of being greater than or equal to a predetermined threshold value.

While not illustrated, the operation assisting device 100 includes, for example, a central processing unit (CPU), a storage medium such as a read only memory (ROM) storing therein a control program, and a working memory such as a random access memory (RAM). In this case, the CPU executes the control program, thereby realizing the functions of the above-mentioned individual units.

In a case where the eyes of the user are directed at the operation target 500 after phrases close to a keyword and similar to one another are repeatedly spoken, it is possible for the operation assisting device 100 having such a configuration to determine that the keyword is spoken. In addition, by determining that the keyword is spoken, it is possible for the operation assisting device 100 to start a predetermined operation for the operation target 500. In other words, it is possible for the operation assisting device 100 to permit the keyword utterance operation in a case where the user erroneously pronounce a keyword more than once in spite of intending to perform the keyword utterance operation.

<Permission of Keyword Utterance Operation>

The case that serves as a trigger, in which the eyes of the user are directed at the operation target 500 after similar phrases are repeatedly spoken, is a case where a possibility that the keyword utterance operation is tired is high. Here, that reason will be described.

Figure 2A:
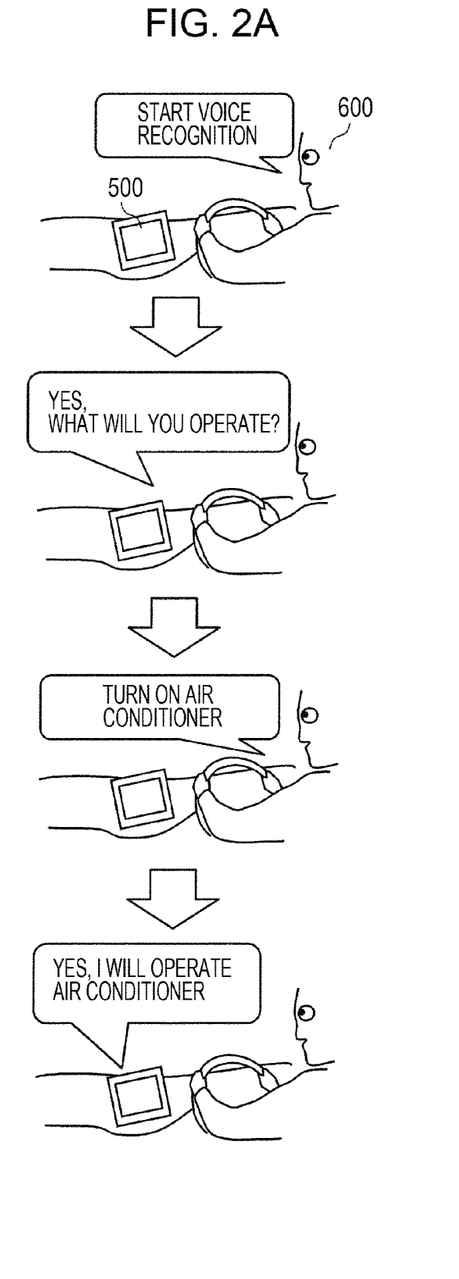
FIGS. 2A and 2B are diagrams illustrating an example of an operation of a user in the present embodiment.
Figure 2B:
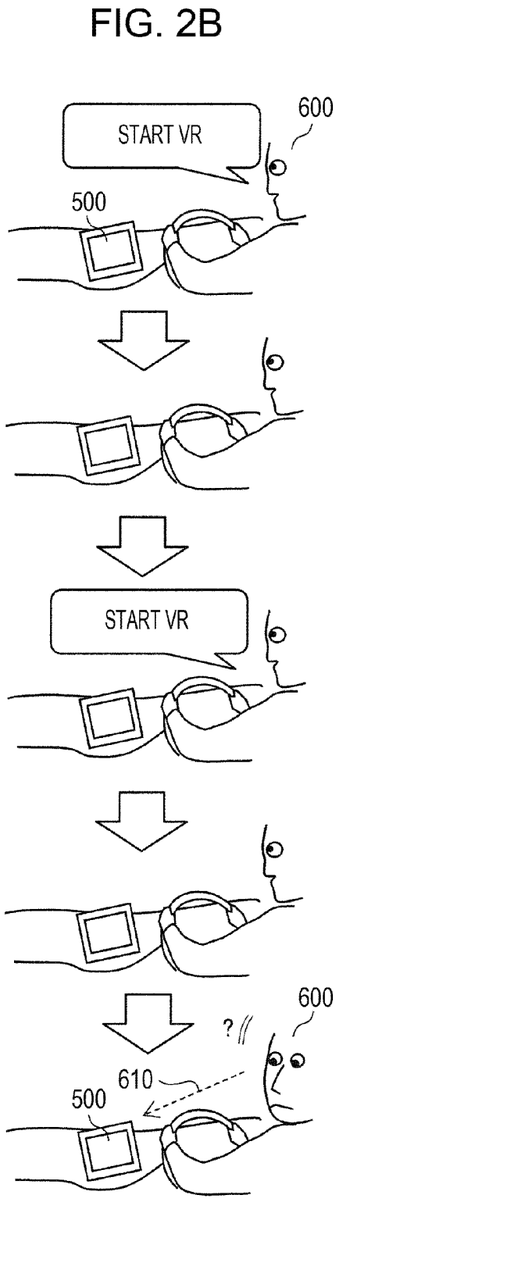

FIGS. 2A and 2B are diagrams illustrating examples of the operations of the user at the time of performing the keyword utterance operation.

Here, as illustrated in FIGS. 2A and 2B, a case where the operation target 500 is the car air-conditioner controller equipped with a display screen and a speaker is exemplified. The operation assisting device 100 is incorporated into the operation target 500 that is, for example, the car air-conditioner controller.

Here, it is assumed that, as a keyword for activating a voice operation function for the operation target 500 based on voice interaction with the user, "Start voice recognition" is preliminarily registered. The voice operation function is a function used by the operation target 500 to receive an operation based on a spoken voice, and is realized using, for example, the voice recognition function of the operation assisting device 100.

In a case where the user 600 speaks "Start voice recognition", the operation target 500 starts voice interaction as the above-mentioned predetermined operation, as illustrated in, for example, FIG. 2A. The operation target 500 outputs, for example, a voice of "Yes, what will you operate?". In a case where the user subsequently speaks "Turn on the air conditioner", the operation target 500 detects this and turns on the car air-conditioner while outputting a voice of "Yes, I will operate the air conditioner" as a response.

On the other hand, in a case where the user 600 mistakes a keyword and speaks "Start VR", the operation target 500 does not start the above-mentioned predetermined operation and does not output the voice of "Yes, what will you operate?", as illustrated in FIG. 2B. Then, the user 600 who feels that the keyword is not recognized repeats the utterance of the same phrase, "Start VR". In addition, in a case where the operation target 500 still does not start an operation in spite of repeating the utterance of the same phrase, the user 600 unconsciously directs eyes 610 at the operation target 500, as illustrated in FIG. 2B. In addition, a probability that the user 600 directs the eyes 610 at the operation target 500 increases with an increase in the number of times the recognition of the spoken keyword continuously fails.

Therefore, in a case where similar phrases are repeatedly spoken and after that, the eyes 610 of the user 600 are directed at the operation target 500, a possibility that the user 600 (or another person such as a fellow passenger) tries the keyword utterance operation may be high.

Figure 3:
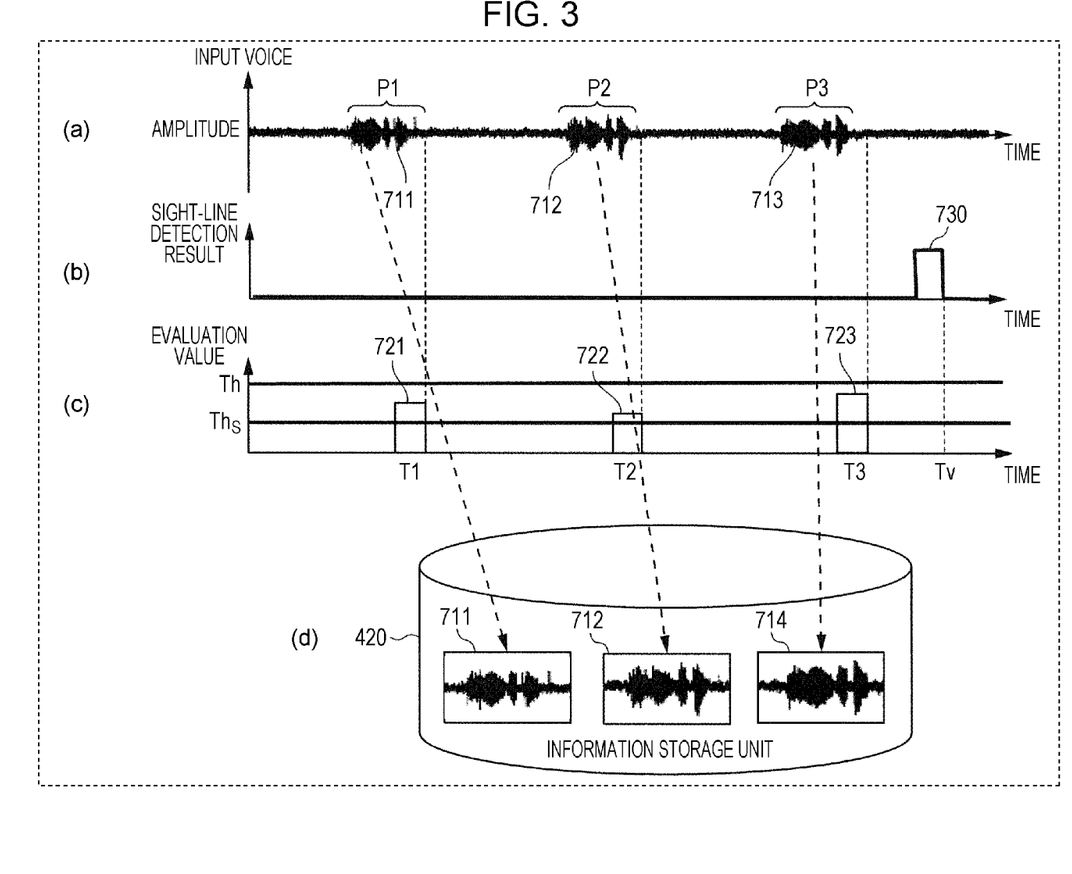
FIG. 3 is a diagram illustrating an example of information detected in a case where a keyword utterance operation in the present embodiment is tried.

FIG. 3 is a diagram illustrating an example of information detected in the operation assisting device 100 in a case where the keyword utterance operation is tried.

FIG. 3(*a*) is a diagram illustrating the temporal waveform of an input voice. FIG. 3(*b*) is a diagram illustrating a detection result of a sight-line direction. FIG. 3(*c*) is a diagram illustrating a relationship between the first and second threshold values and the evaluation value. Horizontal axes in FIG. 3 each correspond to the same temporal axis.

It is assumed that the user speaks a wrong keyword of "Start VR" during time intervals P1, P2, and P3. In this case, as illustrated in FIG. 3(*a*), pieces of voice data 711, 712, and 713 having corresponding waveforms appear during the time intervals P1, P2, and P3, respectively. In addition, as illustrated in FIG. 3(*c*), evaluation values 721, 722, and 723 are calculated at times T1, T2, and T3 corresponding to the time intervals P1, P2, and P3, respectively.

While "Start VR" is different from "Start voice recognition" that is the correct keyword, the sound of the large portion of "Start VR" overlaps therewith. Therefore, as illustrated in FIG. 3(*c*), all the evaluation values 721, 722, and 723 become less than the first threshold value Th and greater than or equal to the second threshold value $Th_S$ (in other words, at the second level). In this case, while keyword detections fails, the pieces of voice data 711, 712, and 713 during the time intervals P1, P2, and P3, respectively, are stored in the information storage unit 420, as illustrated in, FIG. 3(*d*).

In addition, it is assumed that, as illustrated in FIG. 3(*b*), at a time Tv before a predetermined time period elapses since the time T1, a detection result 730 indicating that the eyes of the user are directed at the operation target 500 is obtained.

In this case, similarity between the pieces of stored voice data 711, 712, and 713 is calculated. Here, since the same phrase of "Start VR" is spoken, the similarity is calculated as a value belonging to a predetermined range corresponding to a relatively high value. Then, even though only the wrong keyword of "Start VR" is spoken, the operation assisting device 100 determines that a correct keyword is spoken, and permits the keyword utterance operation.

In this way, in a case where the user tries the keyword utterance operation using the wrong keyword, it is possible for the operation assisting device 100 to detect this and to permit such a keyword utterance operation. Therefore, even in a case where the user forgets a keyword or remembers a wrong keyword, it is possible for the operation assisting device 100 to avoid a state where the keyword utterance operation is disabled.

<Operation of Operation Assisting Device>

Next, the operation of the operation assisting device 100 will be described.

Figure 4:
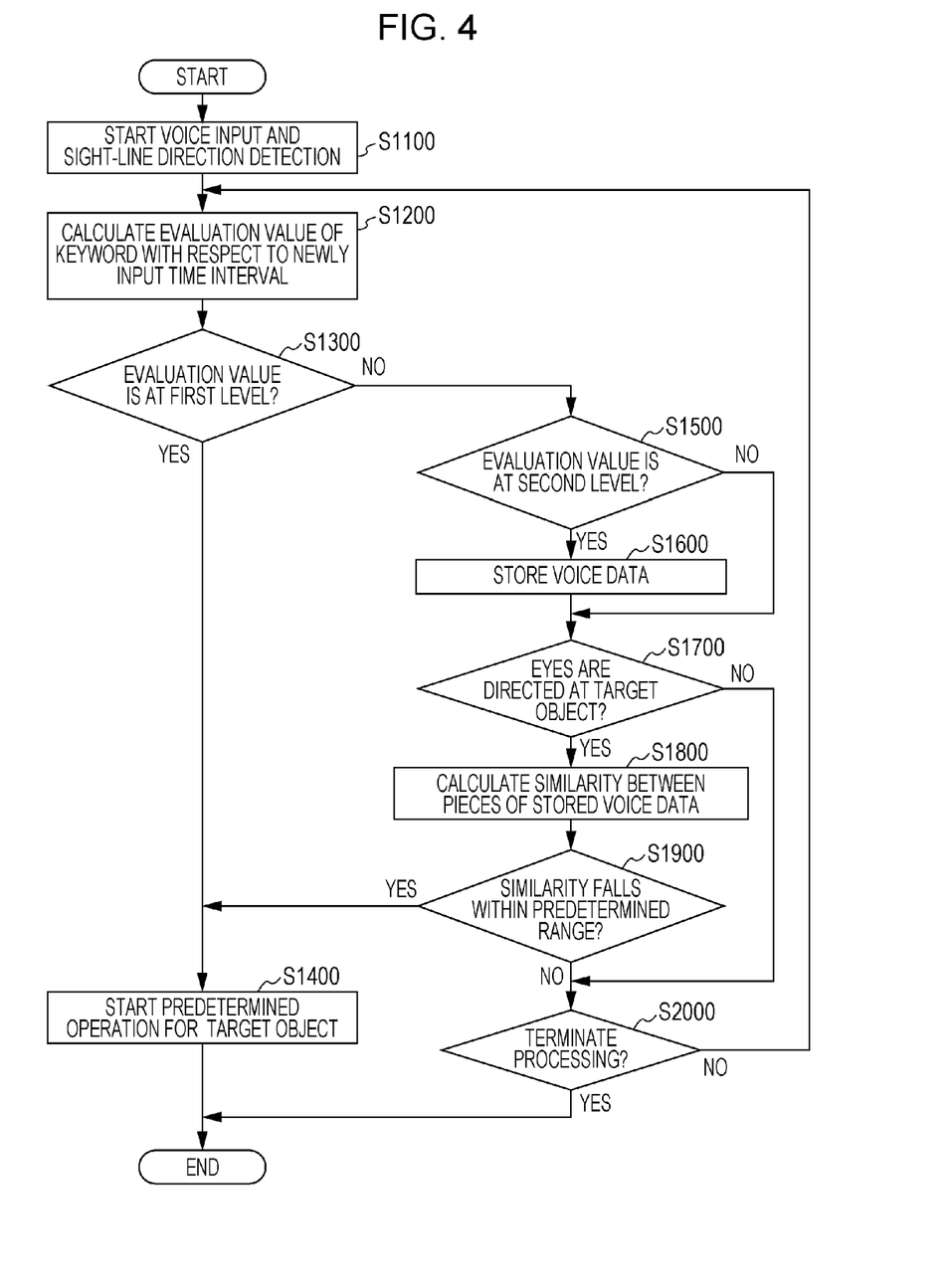
FIG. 4 is a flowchart illustrating an example of an operation of the operation assisting device according to the present embodiment.

FIG. 4 is a flowchart illustrating an example of the operation of the operation assisting device 100. The operation assisting device 100 repeatedly executes processing to be described below while, for example, the operation target 500 does not perform the predetermined operation.

First, in a step S1100, the voice input unit 200 starts inputting of voice data at given time intervals. In addition, the sight-line input unit 300 starts inputting of the direction of the sight-line. In other words, the sight-line input unit 300 starts sight-line determination at given time intervals. In a case where the time interval of the sight-line determination is sufficiently short, even if a time period during which the eyes are directed at the operation target 500 is just only a brief moment, it is possible for the sight-line input unit 300 to detect the time period.

In addition, in a step S1200, the keyword determination unit 410 calculates the evaluation value of a keyword for the time interval of newly input voice data.

In addition, in a step S1300, the keyword determination unit 410 determines whether or not the calculated evaluation value is at the first level (in other words, greater than or equal to the first threshold value). In a case where the evaluation value is at the first level (S1300: YES), the keyword determination unit 410 moves the processing to a step S1400. In addition, in a case where the evaluation value is not at the first level (S1300: NO), the keyword determination unit 410 moves the processing to a step S1500.

In the step S1400, the keyword determination unit 410 starts, for the operation target 500, a predetermined operation such as, for example, the voice interaction described in FIGS. 2A and 2B, and terminates a series of processing operations.

In the step S1500, the keyword determination unit 410 determines whether or not the evaluation value is at the second level (in other words, less than the first threshold value and greater than or equal to the second threshold value). In a case where the evaluation value is at the second level (S1500: YES), the keyword determination unit 410 moves the processing to a step S1600. In addition, in a case where the evaluation value is not at the second level (S1500: NO), the keyword determination unit 410 moves the processing to a step S1700 described later.

In the step S1600, the keyword determination unit 410 stores, in the information storage unit 420, a spoken voice (voice data) whose evaluation value is determined to be at the second level, and moves to the step S1700. In addition, the keyword determination unit 410 stores, in the information storage unit 420, time information indicating time when the spoken voice is input while associating the time information with the spoken voice.

In a case where the user mistakes a keyword and repeatedly speaks a wrong keyword, the voice data of the spoken voice in each case is accumulated in the step S1600.

In addition, every time the above-mentioned predetermined time period elapses since the time when the spoken voice is input, the keyword determination unit 410 may delete the spoken voice from the information storage unit 420. In this case, the keyword determination unit 410 does not necessarily have to store the time information indicating the above-mentioned time.

In the step S1700, the utterance determination unit 430 determines whether or not the eyes are directed at the operation target 500. In other words, the utterance determination unit 430 determines whether or not a notice informing that the eyes of the user are directed at the operation target 500 is received from the sight-line input unit 300. In a case where the eyes are directed at the operation target 500 (S1700: YES), the utterance determination unit 430 moves the processing to a step S1800. In addition, in a case where the eyes are not directed at the operation target 500 (S1700: NO), the utterance determination unit 430 moves the processing to a step S2000 described later.

In the step S1800, the utterance determination unit 430 calculates similarity between a plurality of spoken voices stored in the information storage unit 420. In addition, the utterance determination unit 430 only regards spoken voices input during a predetermined time period, as targets for calculation of the similarity. In addition, in a case where the number of the spoken voices stored in the information storage unit 420 is less than the predetermined number, the utterance determination unit 430 does not calculate the similarity.

In addition, usually, it takes a time period of about a few seconds for the user to recognize no response of the operation target 500 after the utterance of keywords (including an erroneous keyword) and to direct the eyes at the operation target 500. Accordingly, the utterance determination unit 430 may exclude a spoken voice input at the last short time interval, from the targets for the calculation of the similarity.

In addition, in a step S1900, the utterance determination unit 430 determines whether nor not the calculated similarity falls within the predetermined range. In a case where the similarity falls within the predetermined range (step S1900: YES), the utterance determination unit 430 moves the processing to the step S1400. In other words, the utterance determination unit 430 starts the predetermined operation for the operation target 500 and terminates a series of processing operations. In addition, any one of the keyword determination unit 410 and the utterance determination unit 430 may issue an instruction to start the operation in the step S1400.

In addition, in a case where the similarity does not fall within the predetermined range (step S1900: NO), the utterance determination unit 430 moves the processing to a step S2000.

In the step S2000, the keyword detection unit 400 determines whether or not an instruction to terminate the processing of the keyword utterance operation is given by a user operation or the like. In a case where no instruction to terminate the processing is given (S2000: NO), the keyword detection unit 400 returns the processing to the step S1200. In addition, in a case where an instruction to terminate the processing is given (S2000: YES), the keyword detection unit 400 terminates a series of operations.

Based on such an operation, it is possible for the operation assisting device 100 to determine that a keyword is spoken, not only in a case where the keyword is spoken but also in a case where the eyes of the user are directed at the operation target 500 after a phrase close to the keyword is repeatedly spoken.

Figure 5:
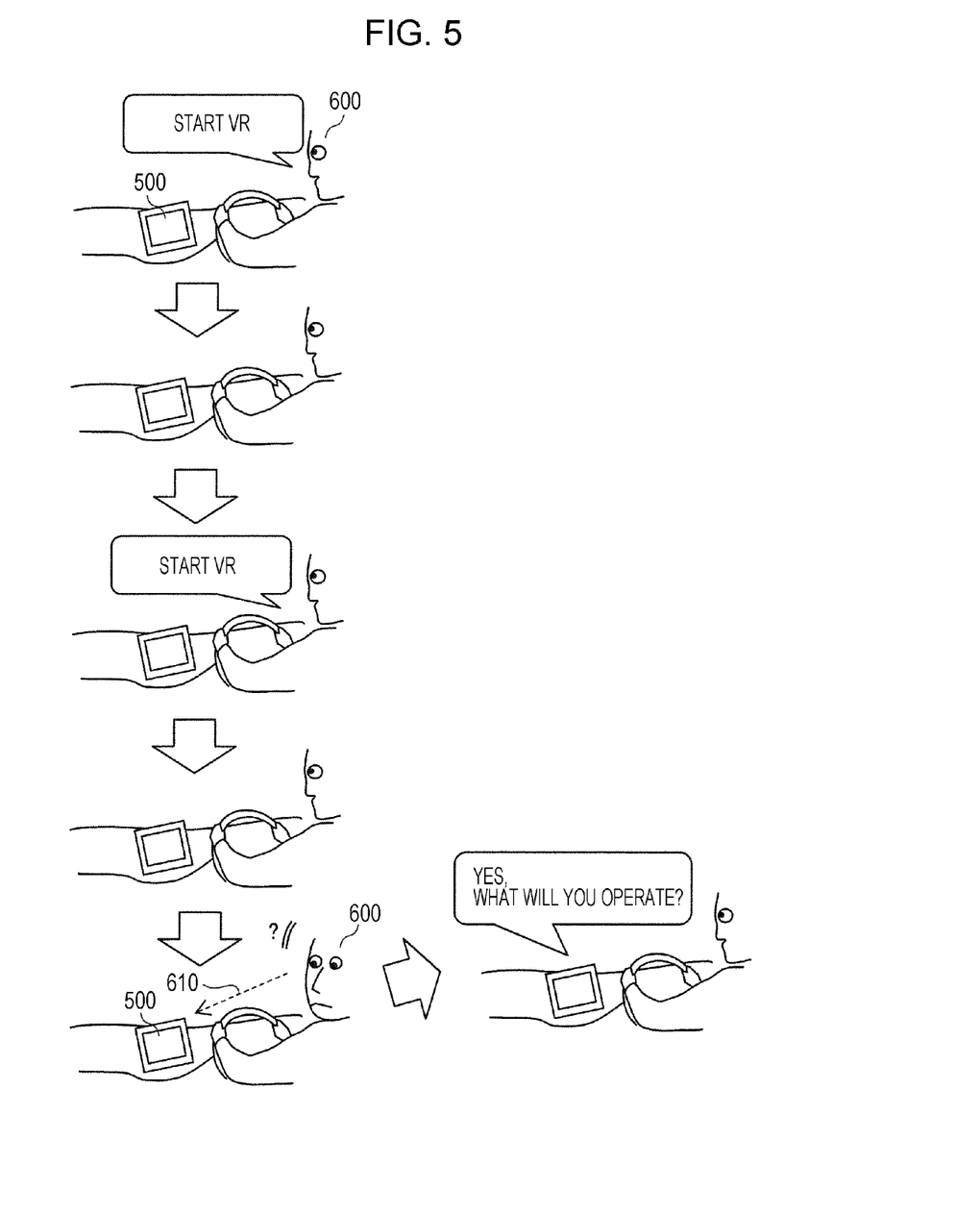
FIG. 5 is a diagram illustrating examples of operations of the user and an operation target in a case where the operation assisting device according to a first embodiment is used.

FIG. 5 is a diagram illustrating examples of the operations of the user and the operation target 500 in a case where the operation assisting device 100 is used, and FIG. 5 corresponds to FIGS. 2A and 2B.

It is assumed that, as illustrated in FIG. 5, since the target 500 to be operated does not respond even through the user 600 repeats utterance of "Start VR" close to a correct keyword, the user 600 directs the eyes 610 at the operation target 500. Then, the function of the operation assisting device 100 considers that the correct keyword is spoken, and a voice of "Yes, what will you operate?" is output from the operation target 500. In other words, the keyword utterance operation for the operation target 500 is performed.

As described above, under the condition that the eyes of the user 600 are directed at the operation target 500 after the similarity between a plurality of spoken voices falls within the predetermined range, the operation assisting device 100 according to the present embodiment determines that a keyword for operating the operation target 500 is spoken.

From this, it is possible for the operation assisting device 100 to avoid an operation failure caused by only speaking an erroneous keyword and to avoid a state where the keyword utterance operation is disabled.

One of the merits of being able to operate an apparatus without requiring a manual operation such as pressing a button, for example, is a merit of being able to operate the apparatus with nothing held even if being located away. A voice interface requiring no button operation is suitable for use in a situation such as driving a car, in which it is difficult to release a hand, and it is possible to realize an apparatus operation with a feeling such as asking, in a voice, a fellow passenger in a front passenger seat to operate an apparatus.

(Examples of Applications of Embodiment)

Note that the operation assisting device described above may regard a plurality of keywords as targets of detection. In addition, in a case where different keywords are registered for respective operation targets, it is necessary to determine whether or not eyes of the user are directed, with respect to each of the operation targets. In this case, the operation assisting device uses, for example, a table in which the respective registered keywords and the directions of the operation targets (sight-line directions to be detected) are associated with each other.

In addition, it is desirable that, as the above-mentioned individual threshold values, a level that is a target for determination of the similarity, and the predetermined time period, appropriate values are adopted based on the type of evaluation value, the type of similarity, the uses of the operation assisting device, the degree of accuracy desired by the user, and so forth. The appropriate values are decided based on, for example, experiments or an empirical rule.

In addition, using voice interaction or the like utilizing a speaker and a microphone, the utterance determination unit may inquire of the user about whether or not a keyword is spoken. In addition, in a case where an answer informing that the keyword is spoken is received from the user and the calculated similarity falls within the predetermined range, the utterance determination unit may determine that the keyword is spoken.

In addition, in a case where the similarity falls within the predetermined range, the utterance determination unit may notify the user of the keyword using a voice output from the speaker or the like. In this case, a possibility that keyword detection for a newly input spoken voice succeeds becomes high.

Alternatively, using voice interaction or the like utilizing the speaker and the microphone, the utterance determination unit may inquire of the user about predetermined information. In addition, in a case where a correct answer is received from the user, the utterance determination unit may notify the user of the keyword. Furthermore, only in a case where the correct answer is obtained and the calculated similarity falls within the predetermined range, the utterance determination unit may notify the user of the keyword.

In addition, the keyword detection unit may switch how to perform voice interaction between a case where the evaluation value of a spoken voice is greater than or equal to the first threshold value and a case where the evaluation value of a spoken voice is less than the first threshold value (a case of permitting the keyword utterance operation). In a case of permitting the keyword utterance operation, the keyword detection unit causes a voice of, for example, "Yes, may I help you?" in place of "Yes, what will you operate?" to be output.

In addition, without regard for the evaluation value, in other words, without regard for a relationship between a keyword and a spoken voice, the operation assisting device may permit the keyword utterance operation. In this case, even though a phrase entirely different from a correct keyword is repeatedly spoken, in a case where after that, the eyes are directed at the operation target, the operation assisting device determines that the keyword is spoken. From this, it is possible to more reliably avoid a state where the keyword utterance operation is disabled. In this case, however, a possibility that it is determined that the keyword is spoken even through the user does not intend to perform the keyword utterance operation becomes high.

In addition, the type of evaluation value, a method for acquiring the evaluation value, a method for sight-line determination, the type of similarity, and a method for acquiring the similarity which are adopted by the operation assisting device, and the uses of a keyword detection result are not limited to the above-mentioned examples. For example, in addition to various kinds of in-vehicle devices such as a car navigation device and a car audio device, various kinds of apparatuses and equipment such as household electrical appliances and plant equipment may be regarded as the above-mentioned operation target.

In addition, part of the configuration of the operation assisting device may be arranged, as a client side device, in the vicinity of a predetermined operation target, and the other part of the configuration of the operation assisting device may be arranged as a device or a system, separated from a client device.

For example, the above-mentioned keyword detection unit may be arranged, as a keyword detection device, in a server or the like arranged on a communication network.

In this case, in the operation assisting device, it is only necessary to provide, for example, a transmission unit that transmits, to the keyword detection device, information indicating an input spoken voice and whether or not eyes are directed at the predetermined operation target, and a reception unit that receives utterance detection information transmitted from the keyword detection device. Here, the utterance detection information is information indicating that it is determined that a keyword is spoken.

In addition, in the keyword detection device, it is only necessary to provide a reception unit that receives the information transmitted from the operation assisting device, the information indicating the spoken voice and whether or not eyes are directed at the predetermined operation target, and a transmission unit that transmits the utterance detection information to the operation assisting device in accordance with the result of the keyword determination by the keyword determination unit.

Furthermore, the keyword determination unit, the information storage unit, and the utterance determination unit within the keyword detection unit may be arranged in different devices independently. In this case, at minimum, it is necessary for the utterance determination unit to acquire an input spoken voice from the voice input unit or the information storage unit and to acquire, from the sight-line input unit, a detection result of whether or not the eyes are directed at the predetermined operation target.

By adopting such a distributed system, it becomes easy to reduce the processing load of each device or to share one functional unit between a plurality of users.

In addition, the hardware configuration of each device is not limited to the above-mentioned examples.

For example, each functional unit may be typically realized as an integrated circuit (IC). Each functional unit may be individually made into one chip, or may be made into one chip so as to include part thereof or the whole thereof. In addition, such an integrated circuit is also called large scale integration (LSI), a system LSI, a super LSI, an ultra LSI, or the like, depending on the degree of integration.

In addition, a method for achieving integration of circuits is not limited to IC and may be realized by dedicated circuits. In other words, each functional unit may be realized using a field programmable gate array (FPGA) programmable after manufacturing an LSI or a reconfigurable processor that enables re-configuration of the connections or settings of circuit cells within an LSI.

Furthermore, using various kinds of techniques for achieving integration of circuits replaceable with LSIs by virtue of advancement of the semiconductor technology or another derived technology, integration of circuits may be performed. As such a technology, for example, the application of a biotechnology may be cited.

In addition, it is only necessary for the memory of each device to be a nonvolatile memory, and the memory of each device may be a memory that holds data using switches, in such a manner as, for example, a dip switch.

The present disclosure is useful as an operation assisting device and an operation assisting method capable of avoiding a state in which the keyword utterance operation is disabled. The present disclosure is suitable for use in, for example, a voice recognition device and a voice interaction device installed in an in-vehicle device.

What is claimed is:

1. An operation assisting method comprising:
   comparing voice data with preliminarily stored keywords associated with an operation target and determining whether the voice data match with the preliminarily stored keywords or not;
   determining whether or not one or more of the preliminarily stored keywords are included in the voice data, and whether or not a similarity between or among the voice data falls within a predetermined range;
   detecting whether or not sight lines of a speaker are directed at the operation target only when it is determined that the voice data do not match with the preliminarily stored keywords, and the similarity between or among the voice data falls within the predetermined range; and
   determining that the one or more of the preliminarily stored keywords are included in the voice data only when the similarity between or among the voice data are within the predetermined range during a predetermined time period before a timing when the sight lines of the speaker are directed at the operation target.

2. The operation assisting method according to claim 1, wherein the voice data are determined to match with the preliminarily stored keywords when the voice data includes one or more words that are same as the preliminarily stored keywords.

3. An operation assisting device comprising:
   a keyword detector that compares voice data with preliminarily stored keywords associated with an operation target and determines whether the voice data match with the preliminarily stored keywords or not; and
   a sight-line detector that detects whether or not sight lines of a speaker are directed at the operation target only when it is determined that the voice data to not include the preliminarily stored keywords, an the similarity between or among the voice data falls within a predetermined range,
   wherein the keyword detector determines that the voice data match with the preliminarily stored keywords in a case where the similarity between or among the voice data is within the predetermined range during a predetermined time period before a timing when the sight-line detector detects that the sight lines of the speaker are directed at the operation target.

4. The operation assisting device according to claim 3, wherein
   the keyword detector starts a predetermined operation for the operation target in a case where it is determined that the voice data match with the preliminarily stored keywords.

5. The operation assisting device according to claim 3, wherein
   the keyword detector activates a voice operation function for the operation target in a case where it is determined that the voice data match with the preliminarily stored keywords.

6. The operation assisting device according to claim 3, wherein
   the keyword detector further calculates an evaluation value indicating a likelihood that the voice data match with the preliminarily stored keywords, and determines that the voice data match with the preliminarily stored keywords, in a case where the calculated evaluation value is greater than or equal to a predetermined threshold value.

7. The operation assisting device according to claim 3, wherein the keyword detector determines that the voice data match with the preliminarily stored keywords when the voice data include one or more words that are same as the preliminarily stored keywords.

8. The operation assisting device according to claim 3, wherein
   the keyword detector includes
   a keyword determiner that calculates an evaluation value indicating a likelihood that the voice data match with the preliminarily stored keywords, and determines that the voice data match with the preliminarily stored keywords, in a case where the calculated evaluation value is greater than or equal to a first threshold value;
   an information storage that stores therein the voice data corresponding to the evaluation value, in a case where the evaluation value is less than the first threshold value and greater than or equal to a second threshold value; and
   an utterance determiner that calculates the similarity between or among the voice data in a case where a predetermined number of the voice data is, input during a predetermined time period before a timing when detecting that the sight lines of the speaker are directed at the operation target, are stored in the information storage, the utterance determiner determining that the voice data match with the preliminarily stored keywords, under a condition that the calculated similarity falls within the predetermined range.

9. The operation assisting device according to claim 8, wherein
   the utterance determiner inquires of the speaker about whether or not the voice data match with the preliminarily stored keywords, and determines that the voice data match with the preliminarily stored keywords, in a case where an asnswer informing that the voice data match with the preliminarily stored keywords is input and the similarity falls within the predetermined range.

10. The operation assisting device according to claim 8, wherein
    the utterance determiner notifies the speaker of the preliminarily stored keywords in a case where the similarity falls within the predetermined range.

11. The operation assisting device according to claim 8, wherein
    the utterance determiner inquires of the speaker about predetermined information, and notifies the speaker of the preliminarily stored keywords in a case where a correct answer is input and the similarity falls within the predetermined range.

12. An operation assisting device comprising:
    a transmitter that performs transmission to a keyword detection device that compares voice data with preliminarily stored keywords associated with an operation target and determines whether or not the voice data match with the preliminarily stored keywords;

a client side receiver that receives utterance detection information indicating that the voice data match with the preliminarily stored keywords is transmitted from the keyword detection device; and a sight-line detector that detects whether or not sight lines of a speaker are directed at the operation target only when it is determined that the voice data do not include the preliminarily stored keywords and the similarity between or among the voice data falls within a predetermined range, wherein the transmitter transmits, to the keyword detection device, information indicating whether or not the sight lines of the speaker are directed at the operation target, and determines that the voice data match with the preliminarily stored keywords, only when the similarity between or among the voice data is within the predetermined range during a predetermined time period before a timing when the sight-line detector detects that the sight lines of the speaker are directed at the operation target.

13. The operation assisting device according to claim 12, wherein the voice data are determined to match with the preliminarily stored keywords when the voice data includes one or more words that are same as the preliminarily stored keywords.

\* \* \* \* \*